United States Patent
Koerner et al.

(10) Patent No.: US 11,174,763 B2
(45) Date of Patent: Nov. 16, 2021

(54) GAS EXCHANGE VALVE FOR AN INTERNAL COMBUSTION ENGINE

(71) Applicant: Mahle International GmbH, Stuttgart (DE)

(72) Inventors: Stephan Koerner, Loechgau (DE); Christoph Luven, Stuttgart (DE); Alexander Mueller, Metzingen (DE); Alexander Puck, Esslingen (DE); Reinhard Rose, Fellbach (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/875,926

(22) Filed: May 15, 2020

(65) Prior Publication Data

US 2020/0362734 A1    Nov. 19, 2020

(30) Foreign Application Priority Data

May 17, 2019   (DE) .......................... 102019207267.4

(51) Int. Cl.
*F01L 3/00*    (2006.01)
*F01L 3/04*    (2006.01)
*B23P 15/00*   (2006.01)

(52) U.S. Cl.
CPC .............. *F01L 3/04* (2013.01); *B23P 15/001* (2013.01)

(58) Field of Classification Search
CPC .................. F01L 3/08; F01L 3/02; F01L 3/04
USPC .................................................. 123/188.11
See application file for complete search history.

(56) References Cited

U.S. PATENT DOCUMENTS

| | | | | |
|---|---|---|---|---|
| 4,873,150 A * | 10/1989 | Doi | ........................... | C23C 4/06 428/627 |
| 5,044,604 A * | 9/1991 | Topham | .................. | F16K 25/04 251/120 |
| 5,441,024 A * | 8/1995 | Wietig | ...................... | F01L 3/04 123/188.3 |
| 5,471,796 A * | 12/1995 | Thompson | .............. | B24B 21/02 451/296 |
| 5,655,493 A * | 8/1997 | Enright | ...................... | F01L 3/04 123/188.11 |
| 6,125,810 A * | 10/2000 | Haselkorn | ................. | F01L 3/02 123/188.6 |
| 7,562,647 B2 * | 7/2009 | Burton | ...................... | F01L 3/04 123/188.3 |
| 2006/0049035 A1 * | 3/2006 | Hosenfeldt | ............. | F01L 1/143 204/192.15 |

(Continued)

FOREIGN PATENT DOCUMENTS

| | | |
|---|---|---|
| CN | 101445946 A | 6/2009 |
| WO | 2016198205 | 12/2016 |

OTHER PUBLICATIONS

English abstract for CN-101445946.

*Primary Examiner* — Long T Tran
*Assistant Examiner* — James J Kim
(74) *Attorney, Agent, or Firm* — Fishman Stewart PLLC

(57) ABSTRACT

A gas exchange valve for an internal combustion engine may include a valve stem and a wear resistance improving functional layer. The valve stem may extend in an axial direction and may transition into a valve plate in the axial direction. The functional layer may include nickel and tungsten. The functional layer may be arranged in a coating area on an outer circumference of the valve stem and may at least partially define a sliding surface.

19 Claims, 2 Drawing Sheets

(56) References Cited

U.S. PATENT DOCUMENTS

| | | | |
|---|---|---|---|
| 2015/0136060 A1* | 5/2015 | Puck | F01L 3/20 123/188.3 |
| 2016/0201811 A1* | 7/2016 | Hunter | F16K 5/0471 166/373 |
| 2017/0204752 A1* | 7/2017 | Kroos | F01L 3/14 |

* cited by examiner

GAS EXCHANGE VALVE FOR AN INTERNAL COMBUSTION ENGINE

CROSS-REFERENCE TO RELATED APPLICATIONS

This application claims priority to German Patent Application No. DE 10 2019 207 267.4, filed on May 17, 2019, the contents of which is hereby incorporated by reference in its entirety.

TECHNICAL FIELD

The invention relates to a gas exchange valve for an internal combustion engine, a valve arrangement comprising a gas exchange valve of this type, as well as a method for producing a gas exchange valve.

BACKGROUND

It has been known for some time to provide gas exchange valves for internal combustion engines with coatings, in order to improve their resistance to mechanical, thermal or chemical stress. In internal combustion engines, gas exchange valves of this type are typically used as inlet valves on the inlet side of a combustion chamber of the internal combustion engine and as outlet valves on the outlet side of the combustion chamber. An inlet valve of this type connects an inlet duct to the combustion chamber or separates the inlet duct from the combustion chamber, respectively. Analogously, an outlet valve of this type connects an outlet duct to the combustion chamber or separates the outlet duct from the combustion chamber, respectively. Thermal stresses acting on a gas exchange valve of this type thereby result predominantly from the temperatures, which prevail in the combustion chamber of the internal combustion engine during the combustion. Mechanical stresses result, for example, from pressures, which are to be sealed by means of the gas exchange valve, in the combustion chamber of the internal combustion engine on the one hand or from actuating forces, which are usually introduced axially into a valve stem of the gas exchange valve. Chemical stresses, for example due to corrosion, result in particular from the possibility of the contact of the gas exchange valve with corrosive media, such as, for example, water or a large variety of lubricants and fuels, which may possibly contain water.

All conventional gas exchange valves comprising coatings for improving the wear resistance, as described above, have disadvantages. With regard to the used coating material, known coatings thus for example often do not comply with the regulation (EG) Nr. 1907/2006 (REACH), and are thus only partly usable, in particular on the European market. In addition, known coatings are often embodied with a comparatively expensive coating material, such as, for example, in the case of the coating known from CN 101445946 B, the coating material of which comprises platinum. Further disadvantages result due to large layer thicknesses.

SUMMARY

It is thus an object of the present invention, in particular for eliminating the above-mentioned disadvantages, to show new ways in the development of gas exchange valves for an internal combustion engine.

This object is solved according to the invention by means of the subject matter of the independent patent claim(s). Preferred embodiments are subject matter of the dependent claim(s).

It is thus the basic idea of the invention to embody a gas exchange valve for an internal combustion engine with a functional layer for improving the wear resistance of the gas exchange valve, whereby the functional layer comprises nickel and tungsten.

A gas exchange valve according to the invention comprises a valve stem, which extends along an axial direction and transitions into a valve plate in the axial direction at an axial end. A functional layer, which serves to improve the wear resistance of the gas exchange valve, is arranged on an outer circumference of the valve stem in a coating area of the valve stem. According to the invention, the functional layer comprises nickel (Ni) and tungsten (W) and forms a sliding surface on the outer circumference of the valve stem. The wear resistance of the gas exchange valve is significantly improved in an advantageous manner by means of the functional layer of nickel and tungsten, in particular on the basis of the proportion of tungsten. The functional layer simultaneously acts in an anti-corrosive manner and is furthermore REACH-compliant.

An adhesive layer is advantageously present between the functional layer and the outer circumference of the valve shank of the gas exchange valve. The adhesive layer comprises nickel (Ni) or consist of nickel (Ni). It is advantageously attained by means of the adhesive layer that the functional layer adheres to the gas exchange valve or to the valve stem of the gas exchange valve, respectively, in an improved manner.

According to a preferred further development of the gas exchange valve, a proportion by weight of tungsten in the functional layer is more than 15% and less than 45%. This proportion by weight of tungsten in the functional layer is preferably more than 30% and less than 40%. Such comparatively high tungsten proportions have a positive impact on the wear of the valve stem as a result of friction with a valve guide, in which the valve stem is guided in an internal combustion engine comprising a gas exchange valve of this type.

A further advantageous further development of the gas exchange valve provides that the functional layer has a functional layer thickness, which is between 5 and 20 µm. The functional layer thickness of the functional layer is preferably between 6 and 12 µm. An embodiment of this type of the functional layer makes it possible to attain an optimal wear resistance of the gas exchange valve, but to simultaneously minimize the amount of a functional layer material, which forms the functional layer, which results in cost advantages.

An adhesive layer thickness of the adhesive layer is advantageously maximally 1 µm. An adhesive layer of this type provides for a particularly strong layer adhesion of the functional layer on the valve stem.

According to a preferred embodiment of the gas exchange valve, the coating area has a coating length of the functional layer of between 60 and 140 mm, measured in the axial direction. The coating area of the functional layer thus extends only over a required length on the valve stem, so that a quantity of a functional layer material forming the functional layer can be saved as compared to a gas exchange valve, which is coated completely therewith, which directly results in material cost advantages.

The adhesive layer in the coating area is advantageously also arranged over a coating length of between 60 and 140 millimeters, measured in the axial direction. Above-mentioned advantages also apply analogously for a reduction of an adhesive layer material, which forms the adhesive layer.

In the case of an advantageous further development of the gas exchange valve, the latter has a base material, which is embodied with a martensitic steel. The gas exchange valve can advantageously be formed with a martensitic steel with the material name X45 or X85. In the alternative, it is also possible to realize the base material of the gas exchange valve with an austenitic steel. An austenitic steel of this type can advantageously have the material name X50 or NIREVA (NFC) 3015 or nickel-based Nimonic 80A. In the alternative, it is also possible to embody the base material of the gas exchange valve with titanium or of titanium. With this selection of the base material, it can be attained in an advantageous manner that the gas exchange valve can be embodied optimally with respect to its mass, its strength, as well as the costs of the base material.

In the case of a further advantageous further development of the gas exchange valve, a stem diameter of the valve stem, measured perpendicular to the axial direction, is between 5 and 12 millimeters. The gas exchange valve can thus advantageously be matched ideally to an area of application. Smaller stem diameters thus lend themselves in particular for a use in passenger car internal combustion engines, and larger stem diameters generally lend themselves for a use in truck internal combustion engines.

The scope of the invention furthermore extends to a valve arrangement comprising a gas exchange valve as described above. In addition to the gas exchange valve, the valve arrangement comprises a valve guide for guiding the gas exchange valve. The gas exchange valve can be moved in the axial direction in the valve guide and is guided so as to be rotatable around the axial direction, wherein the valve guide furthermore does not allow for any further degrees of freedom of the gas exchange valve. The valve guide is formed with a cast material and/or a non-ferrous material and/or a sinter material. With its sliding surface, together with a valve guide surface of the valve guide, the gas exchange valve forms a tribological system in the valve arrangement. The advantages of the gas exchange valve according to the invention, which have already been described above, can also be transferred to a valve arrangement comprising the gas exchange valve, whereby the wear-reducing effect is increased by the described embodiment of the valve guide.

The invention furthermore relates to an internal combustion engine comprising a gas exchange valve according to the invention, as described above. The gas exchange valve is advantageously arranged in a valve arrangement according to the invention in the internal combustion engine. The advantages of the gas exchange valve can accordingly also be transferred to the internal combustion engine comprising the gas exchange valve.

The invention furthermore relates to a method for producing a gas exchange valve. A gas exchange valve according to the invention as described above, can advantageously be produced by means of this method. The method for producing a gas exchange valve of this type comprises a first method step a), according to which a valve stem of the gas exchange valve is provided. The valve stem of the gas exchange valve has a base material, which preferably comprises or is a martensitic steel or an austenitic steel or titanium. The method furthermore comprises a further step b), according to which a functional layer material is provided, which has tungsten (W) and nickel (Ni). In a further method step c), a coating of the valve stem of the gas exchange valve takes place. This coating according to method step c) takes place in particular in a coating area on the valve stem of the gas exchange valve. In method step c), the valve stem of the gas exchange valve is coated with the functional layer material provided in step b) for forming a functional layer, in order to improve the wear resistance of the gas exchange valve. A gas exchange valve according to the invention, as described above, can be produced by means of the method, whereby in particular the advantages of the gas exchange valve can also be transferred to the method. Prior to applying the functional layer, an adhesive layer can be applied.

In the case of an advantageous further development of the method, the latter comprises three additional steps a1), a2), and a3). In the first additional step a1), a degreasing of the valve stem takes place, advantageously in the coating area. Fat and/or oil, which adheres to the valve stem and which optionally adheres to the valve stem itself as a result of the production thereof, is removed by means of the degreasing according to step a1). In response to the degreasing in step a1), non-lipid substances adhering to the valve stem, such as oxides or dust, can also be removed. A provision of a nickel (Ni)-containing adhesive layer material takes place in the second additional step a2). According to the third additional step a3), an adhesive coating of the valve stem with the adhesive layer material takes place in order to form an adhesive layer in order to improve a layer adhesion of the functional layer on the valve stem. This adhesive coating according to step a3) takes place in particular in the coating area. The adhesive layer advantageously adheres particularly well on the valve stem degreased according to step a1). The layer adhesion of the functional layer, in particular when the base material of the gas exchange valve has steel, can be improved significantly by means of the adhesive layer. This is associated with an increased durability of the functional layer itself.

The degreasing in step a1) preferably takes place electrolytically, particularly preferably anodically, and with a current density of approximately 10 A/dm$^2$ and for approximately 40 s. The adhesive coating in step a3) advantageously takes place galvanically. This galvanic adhesive coating according to step a3) takes place with a current density of between 4 and 40 A/dm$^2$. This current density is preferably between 25 and 35 A/dm$^2$. A particularly reliable formation of the adhesive layer and a particularly good adhesion of the adhesive layer itself on the valve stem is thus possible in an advantageous manner.

The coating of the valve stem according to step c) with the functional layer material for forming the functional layer advantageously also takes place galvanically, whereby a current density of between 30 and 300 A/dm$^2$ is used. In step c), the used current density is between 140 and 180 A/dm$^2$. An increased tungsten content is advantageously attained by means of such a comparatively high current density. The specified current densities provide for the largest possible proportion of tungsten in the functional layer, in particular in response to a galvanizing from an aqueous solution of the functional layer material, whereby a maximal proportion by mass of tungsten in the functional layer is approximately 45% in response to the galvanizing with such an aqueous solution. As already mentioned above, a high tungsten content has a positive effect on the desired improvement of the wear resistance of the gas exchange valve.

In the case of a preferred further development, a flushing of the valve stem for cleaning the valve stem takes place when carrying out at least one of steps a), a1), a2), a3), b), and c). Such a flushing particularly preferably takes place after each of the above-mentioned steps. In preparation for a next step, the valve stem or the coating area, respectively, is superficially cleaned by means of such a flushing. A particularly good adhesion of the adhesive layer as well as of the functional layer to the valve stem or the adhesive layer, respectively, and the functional layer to one another is thus attained in an advantageous manner. It is furthermore avoided that the adhesive layer or the functional layer, respectively, has unwanted contaminations other than the adhesive layer material or the functional layer material, respectively.

In the case of an advantageous further development of the method, the latter comprises two further additional steps d) and e). According to method step d), a surface of the gas exchange valve is finished in order to form a sliding surface. This finishing of the surface of the gas exchange valve preferably takes place at least in the coating area. The finishing according to step d) can take place by means of belt polishing and/or barrel finishing and/or lapping. According to a further step e), a hardening of the gas exchange valve or of the functional layer, respectively, takes place in particular in order to increase the surface hardness of the gas exchange valve or of the functional layer, respectively. This hardening can preferably take place by heating the gas exchange valve to between 400 and 550° C., whereby this temperature is maintained for between 0.5 and 2 hours. An initial hardness prior to the hardening of the gas exchange valve of between 500 and 650 HV can be increased to a final hardness of between 900 and 1,000 HV after the hardening by means of the hardening according to step e). It can advantageously be attained by means of these two additional steps d) and e) that the sliding properties of the sliding surface are positively influenced and are in particular also made more durable.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
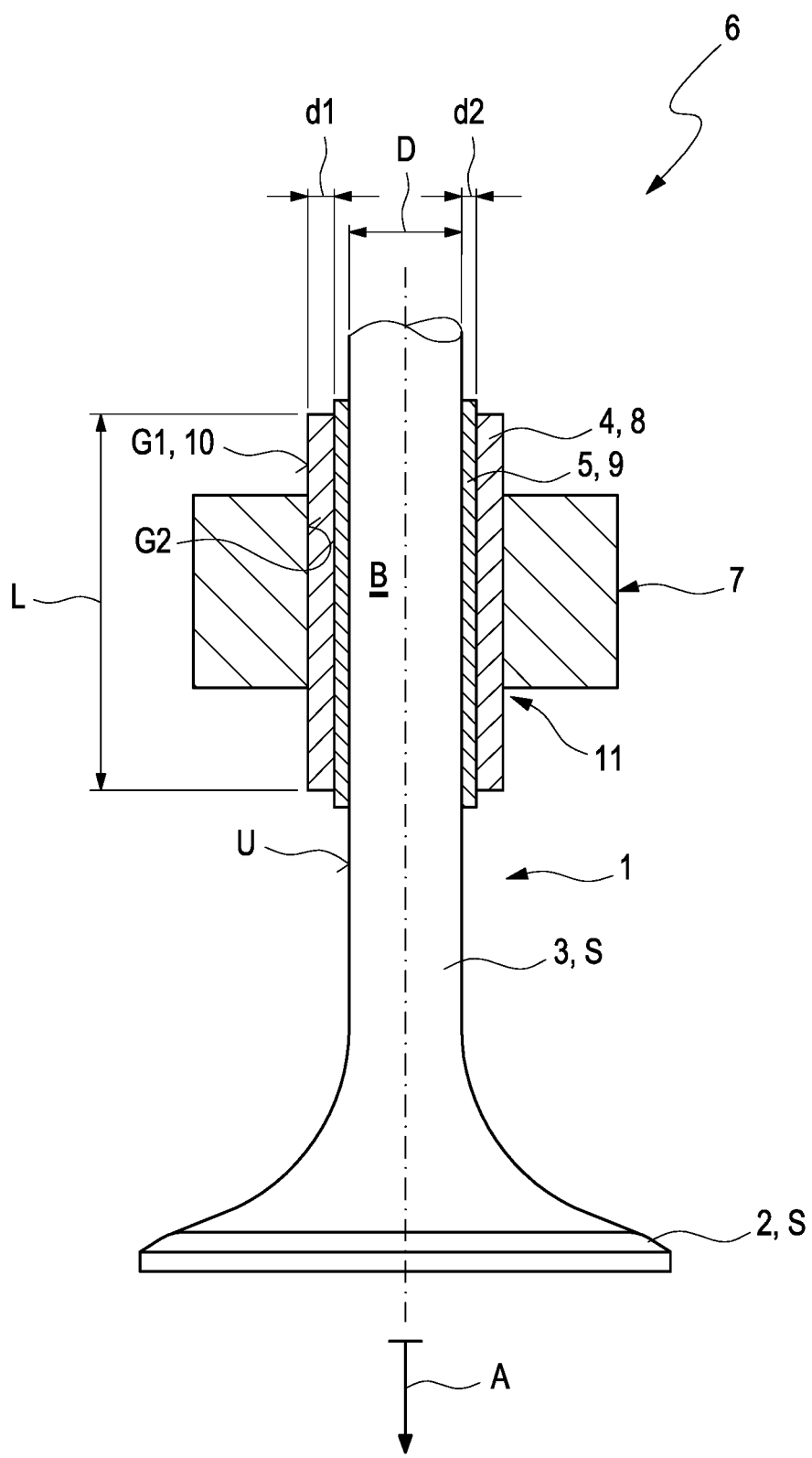
FIG. 1 shows an example of a gas exchange valve according to the invention in an exemplary valve arrangement, which is also in accordance with the invention.

The gas exchange valve 1 shown in FIG. 1 in an exemplary manner, which can be used for an internal combustion engine, has a valve stem 3 and a valve plate 2. The valve stem 3 extends in an axial direction A and transitions into a valve plate 2 in the axial direction A at an axial end. The gas exchange valve 1 further comprises a functional layer 4. The functional layer 4 serves to improve the wear resistance of the gas exchange valve 1. The functional layer 4 comprises nickel (Ni) and tungsten (W). The functional layer 4 is arranged in a coating area B of the valve stem 3 on the outer circumference U thereof. A sliding surface G1 of the valve stem 3 is formed by means of the functional layer 4. The gas exchange valve 1 further has an adhesive layer 5, which is arranged between the functional layer 4 and the outer circumference U of the valve stem 3. The adhesive layer 5 comprises nickel (Ni) or consist of nickel (Ni). The adhesive layer 5 serves to improve a layer adhesion of the functional layer 4. The functional layer 4 has a proportion by weight of tungsten of more than 15% and less than 45%. The proportion by weight of tungsten in the functional layer 4 preferably lies between 30% and 40%. The functional layer 4 has a functional layer thickness d1. The functional layer thickness d1 is between 5 and 20 μm. The functional layer thickness d1 is preferably between 6 and 12 μm. The adhesive layer 5 has an adhesive layer thickness d2. This adhesive layer thickness d2 is maximally 1 μm. Measured in the axial direction A, a coating length L of the functional layer 4 in the coating area B is 60-140 mm. In the example of FIG. 1, the adhesive layer 5 is likewise present in the coating area B over a coating length L. The gas exchange valve 1 has a base material S. The valve plate 2 and the valve stem 3 are formed with the base material S. In the shown example, the base material S of the gas exchange valve 1 is formed of a martensitic steel. The base material S is preferably formed of a martensitic steel comprising a material name X45 or X85. In the alternative, it is also possible to embody the base material S with an austenitic steel. The base material S can then preferably be formed with an austenitic steel with a material name X50 or NIREVA (NFC) 3015 or nickel-based Nimonic 80A. In the alternative, the base material S of the gas exchange valve 1 can comprise or be titanium (Ti). In particular in the case of an embodiment of the base material S of steel, as shown in the example of FIG. 1, the adhesive layer 5 serves the purpose of improving the layer adhesion. A stem diameter D of the valve stem 3, which is measured perpendicular to the axial direction A, is between 5 and 12 mm. Smaller stem diameters D are particularly suitable for the use in passenger car internal combustion engines, whereas larger stem diameters D lend themselves specifically for example for truck internal combustion engines.

A valve arrangement 6 comprising a gas exchange valve 1 is furthermore illustrated in FIG. 1. To form the valve arrangement 6, the gas exchange valve 1 is guided in a valve guide 7. In the illustrated example, the valve guide 7 is embodied in a bushing-like manner for this purpose, whereby the bushing comprises a bore, which forms a valve guide surface G2, which surrounds the valve stem 3 of the gas exchange valve 1 in the valve arrangement 6. The valve guide 7 comprises a cast material and/or a non-ferrous material and/or a sinter material. Together with the valve guide surface G2 of the valve guide 7, a tribological system 11 is formed with the gas exchange valve 1 and its sliding surface G1. The gas exchange valve 1 can be moved in an axially guided manner in the valve arrangement 6 by means of the valve guide 7 in order to actuate said gas exchange valve, and can be rotated around the axial direction A. The gas exchange valve 1, which is supported in the valve guide 7, does not have further degrees of freedom in the valve arrangement 6.

Figure 2:
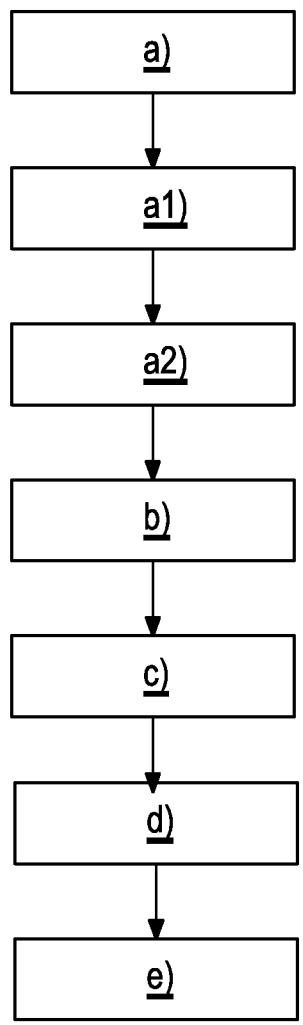
FIG. 2 shows a flowchart of an example of a method according to the invention for producing the exemplary gas exchange valve of FIG. 1.

A flowchart of an exemplary method according to the invention for producing a gas exchange valve 1 is illustrated in FIG. 2. A gas exchange valve 1 according to the invention, as it is shown in an exemplary manner in FIG. 1 and as it is introduced above in an exemplary manner, can in particular be produced by means of this method. In the illustrated example, the method for producing the gas exchange valve 1 comprises seven method steps a), a1), a2), b), c), d), e). It goes without saying that the order of the method steps shown in FIG. 2 is to be understood merely in an exemplary manner, and that other orders of the method steps are also conceivable, without leaving the scope of the invention. The method for producing the gas exchange valve 1 comprises a first method step a), according to which a valve stem 3 of the gas exchange valve 1 is provided. The valve stem 3 of the gas exchange valve 1 is made of a base material S, which preferably comprises or is a martensitic steel or an austenitic steel—or combinations of these steels—or titanium (Ti). A functional layer material 8 is provided in a further method step b). The functional layer material 8 has tungsten (W) and nickel (Ni). The valve stem 3 of the gas exchange valve 1 is coated with the functional layer material 8 in a further method step c). This coating preferably takes place in a coating area B on an outer circumference U of the valve stem 3 of the gas exchange valve 1. A functional layer 4 for improving the wear resistance of the gas exchange valve 1 is formed of the functional layer material 8 by means of the coating according to step c).

In the example of FIG. 2, the method furthermore comprises a first additional step a1), which consists in a degreasing of the valve stem 3 in the coating area B. Oil and/or fat, which, due to the production of the valve shaft 3, possibly adheres to the latter, is removed in this step a1). The method furthermore comprises a method step a2), according to which an adhesive layer material 9 is provided, which has nickel (Ni). In a further method step a3), an adhesive coating of the valve stem 3 with the adhesive layer material 9 takes place. An adhesive layer 5 for improving a layer adhesion of the functional layer 4 is formed according to method step a3) by means of the adhesive coating of the valve stem 3. The adhesive coating according to step a3) preferably takes place in the coating area B on the outer circumference U of the valve stem 3 of the gas exchange valve 1. Method steps a1), a2), and a3) provide for an improved layer adhesion of the functional layer 4 on the gas exchange valve 1, in particular in the case of a base material S of the gas exchange valve 1 of steel. It is also possible, however, to embody the gas exchange valve 1 without an adhesive layer 5 of this type, from which it follows that the method for producing a gas exchange valve 1 of this type can also be realized without method steps a2) and a3). The degreasing according to step a1) takes place electrolytically. The electrolytic decreasing according to step a1) can take place anodically, which means that the valve stem 3, which is to be degreased, forms an anode in response to the electrolytic degreasing. The degreasing in step a1) is carried out by means of a current density of approximately 10 A/dm$^2$ for approximately 40 s. The adhesive coating of the valve stem 3 according to step a3) takes place galvanically and with a current density of between 4 and 40 A/dm$^2$. The adhesive coating in step a3) preferably takes place galvanically and with a current density of between 25 and 35 A/dm$^2$. The coating in step c) likewise takes place galvanically and with a current density of between 30 and 300 A/dm$^2$. The coating in step c) preferably takes place galvanically and with a current density of between 140 and 180 A/dm$^2$. A flushing of the valve stem 3 takes place after steps a), a1), a2), a3), b), and c). After one of steps a), a1), a2), a3), b), and c), the valve stem 3 or the coating area B of the valve stem 3, respectively, is in each case prepared for a chronologically following step by means of the flushing. The method for producing a gas exchange valve 1 furthermore comprises a step d), according to which a surface of the gas exchange valve 1 is finished in order to form a sliding surface G1. This finishing in step d) preferably takes place in the coating area B. The finishing according to step d) can take place, for example, by means of belt polishing and/or barrel finishing and/or lapping. A further method step e) consists in a hardening of the gas exchange valve 1. A surface hardness of the gas exchange valve 1 or of the functional layer 4, respectively, is preferably increased thereby. The hardening of the gas exchange valve 1 according to step e) can take place by means of a heating to between 400 and 550° C., whereby this heating is carried out for between 0.5 and 2 hours. After the hardening, an initial hardness prior to the hardening of between 500 and 650 HV to a final hardness of between 900 and 1,000 HV can be increased by means of the hardening according to step e).

X45: X45CrSi9-3
X85: X85CrMoV18-2
X50: X50CrMnNiNbN21-9
NIREVA 3015: X5NiCrTiAlMoNb32-15-3-2
Nimonic 80A: NiCr20TiAl

The invention claimed is:

1. A gas exchange valve for an internal combustion engine, comprising:
   a valve stem which extends in an axial direction and transitions into a valve plate in the axial direction;
   a wear resistance improving functional layer including nickel and tungsten;
   wherein a proportion by weight of tungsten in the functional layer is more than 15% and less than 45%;
   wherein the functional layer is arranged in a coating area on an outer circumference of the valve stem; and
   wherein the functional layer at least partially defines a sliding surface of the valve stem.

2. The gas exchange valve according to claim 1, further comprising an adhesive layer including nickel, wherein:
   the adhesive layer is disposed between the functional layer and the outer circumference; and
   the adhesive layer is configured to improve a layer adhesion of the functional layer.

3. The gas exchange valve according to claim 2, wherein:
   the functional layer has a functional layer thickness of 5 micrometers to 20 micrometers; and
   the adhesive layer has an adhesive layer thickness of 1 micrometer or less.

4. The gas exchange valve according to claim 1, wherein, in the coating area, the functional layer has an axial coating length of 60 millimeters to 140 millimeters.

5. The gas exchange valve according to claim 1, wherein the valve stem and the valve plate are composed of a base material including at least one of:
   a martensitic steel;
   an austenitic steel; and
   titanium.

6. The gas exchange valve according to claim 1, wherein the valve stem has a stem diameter extending perpendicular to the axial direction that is 5 millimeters to 12 millimeters.

7. The gas exchange valve according to claim 1, wherein the proportion by weight of tungsten in the functional layer is more than 30% and less than 40%.

8. A valve arrangement for an internal combustion engine, comprising:
   a gas exchange valve including a valve plate, a valve stem that extends in an axial direction and that transitions into the valve plate in the axial direction, a wear resistance improving functional layer including nickel and tungsten, and an adhesive layer including nickel;

a valve guide structured and arranged to guide the gas exchange valve, the valve guide including at least one of a cast material, a non-ferrous material, and a sinter material;

wherein the functional layer is arranged in a coating area on an outer circumference of the valve stem and at least partially defines a sliding surface of the gas exchange valve;

wherein the sliding surface of the gas exchange valve abuts against a valve guide surface of the valve guide forming a tribological system;

wherein the adhesive layer is disposed between the functional layer and the outer circumference; and wherein the adhesive layer is configured to improve a layer adhesion of the functional layer.

9. An internal combustion engine, comprising the valve arrangement according to claim 8.

10. A method for producing a gas exchange valve, comprising:

providing a valve stem composed of a base material including at least one of a martensitic steel, an austenitic steel, and titanium;

providing a functional layer material including tungsten and nickel; and forming a wear resistance improving functional layer on an outer circumference of the valve stem via coating a coating area of the valve stem with the functional layer material, the functional layer at least partially defining a sliding surface of the valve stem;

wherein a proportion by weight of tungsten in the functional layer is more than 15% and less than 45%.

11. The method according to claim 10, further comprising degreasing the valve stem to remove at least one of fat and oil adhering to the valve stem.

12. The method according to claim 10, further comprising:

electrolytically degreasing the valve stem with a current density of approximately 10 A/dm2 to remove at least one of fat and oil adhering to the valve stem;

forming an adhesive layer on the valve stem via galvanically coating the coating area with an adhesive layer material including nickel with a current density of 4 A/dm2 to 40 A/dm2; and wherein coating the coating area of the valve stem with the functional layer material is performed galvanically and with a current density of between 30 A/dm2 to 300 A/dm$^2$.

13. The method according to claim 10, further comprising finishing a surface of the valve stem in the coating area to form the sliding surface via at least one of belt polishing, barrel finishing, and lapping.

14. The method according to claim 10, further comprising hardening the gas exchange valve to increase a surface hardness of the gas exchange valve from an initial hardness of 500 HV to 650 HV to a final hardness of 900 HV to 1,000 HV via heating the gas exchange valve.

15. The method according to claim 10, wherein coating the coating area of the valve stem with the functional layer material is performed galvanically with a current density of 140 A/dm2 to 180 A/dm2.

16. The method according to claim 10, further comprising:

providing an adhesive layer material including nickel; and forming an adhesive layer via coating the coating area of the valve stem with the adhesive layer material.

17. The method according to claim 16, wherein coating the coating area of the valve stem with the adhesive material is performed galvanically with a current density of 25 A/dm2 to 35 A/dm2.

18. The method according to claim 11, wherein the valve stem is degreased anodically with a current density of approximately 10 A/dm2.

19. The method according to claim 12, further comprising cleaning the valve stem via flushing the valve stem, wherein cleaning the valve stem is performed after each of:

electrolytically degreasing the valve stem;

forming the adhesive layer on the valve stem; and forming the functional layer on the valve stem.

* * * * *